United States Patent
Guo et al.

(10) Patent No.: US 11,050,564 B1
(45) Date of Patent: Jun. 29, 2021

(54) ROBUST AND RELIABLE EDGE STORAGE METHOD AND SYSTEM FOR THE INTERNET OF THINGS

(71) Applicant: Deke Guo, Hunan (CN)

(72) Inventors: Deke Guo, Hunan (CN); Junxu Xia, Hunan (CN); Geyao Cheng, Hunan (CN); Long Zheng, Hunan (CN)

(73) Assignee: Deke Guo, Changsha (CN)

( * ) Notice: Subject to any disclaimer, the term of this patent is extended or adjusted under 35 U.S.C. 154(b) by 0 days.

(21) Appl. No.: 17/020,091

(22) Filed: Sep. 14, 2020

(30) Foreign Application Priority Data

Jan. 13, 2020 (CN) .......................... 202010029259.4

(51) Int. Cl.
| | |
|---|---|
| *H04L 9/32* | (2006.01) |
| *G06F 11/10* | (2006.01) |
| *H04L 9/08* | (2006.01) |
| *H04L 29/06* | (2006.01) |
| *G06F 21/60* | (2013.01) |

(52) U.S. Cl.
CPC .......... *H04L 9/321* (2013.01); *G06F 11/1004* (2013.01); *G06F 21/602* (2013.01); *H04L 9/0861* (2013.01); *H04L 63/0884* (2013.01)

(58) Field of Classification Search
CPC ... H04L 9/0861; H04L 9/321; H04L 63/0884; G06F 11/1004; G06F 21/602
USPC ........................................................ 713/155
See application file for complete search history.

(56) References Cited

U.S. PATENT DOCUMENTS

| | | | | |
|---|---|---|---|---|
| 7,551,740 | B2 * | 6/2009 | Lee .......................... | H04L 9/085 380/278 |
| 8,607,122 | B2 * | 12/2013 | Resch ................... | G06F 11/073 714/763 |
| 8,719,594 | B2 * | 5/2014 | Dodgson ............... | H04L 9/0894 713/193 |
| 2003/0002499 | A1 * | 1/2003 | Cummings ........... | H04L 1/1877 370/389 |

(Continued)

OTHER PUBLICATIONS

NPL Search Terms (Year: 2020).*
D. Robert A. Johnson: "MLS-Net and SecureParser: A New Method for Securing and Segregating Network Data" [Online] Jul. 8, 2007:XP002582437 4th International Symposium on Risk Management and Informatics: WMS12007, Orlando Florida, USA (Year: 2007).*

(Continued)

*Primary Examiner* — Syed A Zaidi
(74) *Attorney, Agent, or Firm* — Dragon Sun Law Firm, PC; Jinggao Li, Esq.

(57) ABSTRACT

Disclosed are a robust and reliable edge storage method for the Internet of Things and a system therefor. A data owner server splits and encrypts raw data into an encrypted data segment, sets a trusted data access control policy and sends it to a third-party proxy server, and sends the encrypted data segment and the trusted data access control policy to a processing server; the processing server stores the encrypted data segment based on a totally local reconstruction code scheme, and forwards the request sent by a data requester server to the third-party proxy server; the third-party proxy server determines whether the data requester server that sends the request is trustable according to the trusted data access control policy, if it is trusted, then sends decrypted information to the data requester server through the processing server; the data requester server decrypts the encrypted data segment according to the decrypted information to obtain the raw data.

6 Claims, 8 Drawing Sheets

(56) References Cited

U.S. PATENT DOCUMENTS

| | | | | |
|---|---|---|---|---|
| 2003/0152226 A1* | 8/2003 | Candelore | | H04N 7/165 |
| | | | | 380/218 |
| 2010/0074437 A1* | 3/2010 | Inami | | H04N 1/4486 |
| | | | | 380/28 |
| 2011/0019816 A1* | 1/2011 | Inami | | H04L 9/08 |
| | | | | 380/28 |
| 2013/0290703 A1* | 10/2013 | Resch | | G06F 3/0619 |
| | | | | 713/155 |
| 2014/0359276 A1* | 12/2014 | Resch | | H04L 63/061 |
| | | | | 713/153 |
| 2015/0052354 A1* | 2/2015 | Purohit | | G06F 21/6272 |
| | | | | 713/165 |
| 2015/0229329 A1* | 8/2015 | Yamada | | H03M 13/1105 |
| | | | | 714/759 |

OTHER PUBLICATIONS

E. M. Shen, B. Ma, L. Zhu, X. Du and K. Xu, "Secure phrase search for intelligent processing of encrypted data in cloud-based IoT", IEEE Internet Things J., vol. 6, No. 2, pp. 1998-2008, Apr. 2019 (Year: 2019).*

Sabre A. Schnitzer, Robert A. Johnson, and Henry Hoyt. 2005. Secured storage using secureParserTM;. In Proceedings of the 2005 ACM workshop on Storage security and survivability (StorageSS '05). ACM, New York, NY, USA, 135-140 (Year: 2005).*

H.-Y. Lin and W.-G. Tzeng, "A secure erasure code-based cloud storage system with secure data forwarding", IEEE Trans. Parallel Distrib. Syst., vol. 23, No. 6, pp. 995-1003, Jun. 2012 (Year: 2012).*

NPL Search Terms (Year: 2021).*

\* cited by examiner

TLRC(9, 3, 3)

ROBUST AND RELIABLE EDGE STORAGE METHOD AND SYSTEM FOR THE INTERNET OF THINGS

TECHNICAL FIELD

The present invention relates to the field of computer technology, in particular to a robust and reliable edge storage method for the Internet of Things and a system therefor.

BACKGROUND OF THE RELATED ART

Massive data generated by Internet of Things (hereinafter referred to as "IoT") devices put huge pressure on the back-end storage system. Due to the limitations of present fault-tolerant technologies and access control methods, the present edge storage model cannot provide secured data robustness and IoT data self-adaptive sharing capability, and is also deficient in such aspects as the communication cost, the response delay, security, etc. With the rapid deployment of IoT devices, the generation of massive sensitive data at high speed brings the challenge of "edge big data". In order to store the massive data, a large number of edge servers participate in the edge storage system to provide higher storage capacity. Present edge storage technologies lack efficient fault-tolerant technologies to maintain data availability when facing server failures. In addition, the edge server is usually composed of many private or public clouds, and the diversity of the composition makes it likely for the stored data to be leaked by the cloud owner. In addition, the data sharing of the present edge storage technology is restricted, and there is no effective access control mechanism to achieve adaptive data sharing. Although the present storage technologies based on erasure code system can achieve higher data security, because each storage node only has a part of the original file, there still exists the potential risk of data leakage, simply so because some of the edge servers access complete data during storage or encoding, and this is not conducive to data security. Even if a secret key is provided to enhance data security, providing a virtual interface to key owners or specially assigned data requesters to access data greatly limits large-scale data sharing. The present edge storage technology assesses the trust level of the data requester through the data owner or through a third-party assessment proxy, but the third-party assessment proxy is only semi-trusted, and it might go contrary to the commercial interests of agreements, resulting in the leakage of private data. Only one third-party assessment proxy is likely to leak data because it tends to be bribed by malicious data requesters. Many present edge storage systems usually deploy multiple copies of each file and store them on different edge servers to ensure the robustness of the data. Should one storage node fail, the service can be automatically switched to another copy to ensure the reliability of data storage. However, maintaining a copy in such a system can be very expensive because of a very high storage space overhead. In addition, when a storage server is attacked, complete data is easily leaked out, and this is detrimental to the protection of edge private data.

SUMMARY OF THE INVENTION

In view of the above, the objective of the present invention is to disclose a robust and reliable edge storage method and a system for the Internet of Things, so as to solve defects of the present edge storage technology having low data robustness, poor data self-adaptive sharing capability, non-optimization in such aspects as communication overhead, response delay, and security, lacking efficient fault-tolerant technology to maintain the availability of data when facing server failures, and a high probability of data leakage.

Based on the above objective, the robust and reliable edge storage method for the Internet of Things provided by the present invention comprises:

a data owner server that splits and encrypts raw data into an encrypted data segment, sets a trusted data access control policy and sends it to a third-party proxy server, and sends the encrypted data segment and the trusted data access control policy to a processing server;

the processing server stores the encrypted data segment based on a totally local reconstruction code scheme;

the processing server receives a request sent by a data requester server and forwards it to the third-party proxy server;

the third-party proxy server determines whether the data requester server that sends the request is trustable according to the received trusted data access control policy, if it is trusted, then sends decrypted information to the data requester server through the processing server;

the data requester server generates a secret key according to the decrypted information and decrypts the encrypted data segment to obtain the raw data.

Alternatively, the data owner server splits and encrypts raw data into an encrypted data segment, and the process includes the data owner server splitting and encrypting the raw data into k encrypted data segments based on the totally local reconstruction code scheme, and forming a rectangular coding structure including q rows and r columns, where k=q*r.

Alternatively, the processing server forms a local parity check segment according to all the encrypted data segments in the row or the column based on the totally local reconstruction code scheme, for storing the encrypted data segments.

Alternatively, the processing server receives the request sent by the data requester server and forwards it to the third-party proxy server, and this specifically comprises: the processing server receiving a request sent by the data requester server, determining whether the data requester is the data owner server according to the trusted data access control policy, if so, then sending the decrypted information to the data owner server; if not, then forwarding the request to the third-party proxy server.

Alternatively, the third-party proxy server determines whether the data requester server that sends the request is trustable according to the received trusted data access control policy, and this specifically comprises: the third-party proxy server being provided with at least four reputation center servers, and the at least four reputation center servers determining whether the data requester server is initially trustable, if so, then all the at least four reputation center servers sending consent operations, if not, at least two reputation center servers sending rejection operations.

Alternatively, trust value of the data requester server is greater than a predefined threshold of the reputation center server, then the data requester server is initially trustable; if the trust value of the data requester server is less than or equal to the predefined threshold of the reputation center server, then the data requester server is not trusted.

Alternatively, the trusted data access control policy configured to determine whether the data requester server is trustable, further comprises the following processes:

if at least one of the reputation center servers sends the rejection operation, then the data requester server is not trusted, and the third-party proxy server does not send the decrypted information to the data requester server through the processing server;

if all the reputation center servers do not send the rejection operation, then the data requester server is trustable, and the third-party proxy server sends the decrypted information to the data requester server through the processing server.

Alternatively, if the encrypted data segment contains personal privacy data, and at least three of the reputation center servers all send consent operations, then the data requester server is trustable, and the third-party proxy server sends the decrypted information to the data requester server through the processing server.

Based on the same inventive concept, there is provided a robust and reliable edge storage system for Internet of Things, the system comprising:

a data owner server, splitting and encrypting raw data into an encrypted data segment, setting a trusted data access control policy, sending the encrypted data segment and the trusted data access control policy to a processing server, and sending the trusted data access control policy to a third-party proxy server;

the processing server configured to store the encrypted data segment based on a totally local reconstruction code scheme, receive a request sent by a data requester server and forward it to the third-party proxy server;

the third-party proxy server configured to determine whether the data requester server that sends the request is trustable according to the received trusted data access control policy, if it is trusted, then send decrypted information to a data owner through the processing server;

the data requester server configured to generate a secret key according to the decrypted information and decrypt the encrypted data segment to obtain the raw data.

Alternatively, when the encrypted data segment fails, the processing server extracts all the encrypted data segments and a local parity check segment from the row or the column where the failed encrypted data segment is located based on the totally local reconstruction code scheme to recover the failed encrypted data segment.

As can be seen from the above, a robust and reliable edge storage method for the Internet of Things and a system therefor are provided by the present invention. The data owner server reduces the communication overhead and response delay by splitting the raw data based on the totally local reconstruction code scheme, the processing server in the present invention improves data robustness and security by storing the encrypted data segment based on the totally local reconstruction code scheme, and when the server fails or the encrypted data segment fails, the processing server performs data recovery based on the totally local reconstruction code scheme. The recovery process only recovers within the range of the one row or one column and does not access the complete raw data. It provides an efficient fault-tolerant technology to maintain the availability of data and reduce the chance of data leakage. The present invention ensures that the third-party proxy server protects the data by setting at least four reputation center servers, even if a reputation center server is bribed by a malicious data requester, as long as at least one of the reputation center servers has not been bribed, data security can be ensured through the trusted data access control policy.

BRIEF DESCRIPTION OF DRAWINGS

In order to more clearly explain the embodiments of the present invention or the technical solutions in the prior art, the following will briefly introduce the drawings required in the depiction of embodiments or the description of the prior art. Apparently, the drawings in the following description are merely some embodiments of the present invention. For those of ordinary skill in the art, without having any creative work, other drawings can be obtained based on these drawings.

SPECIFIC EMBODIMENTS FOR CARRYING OUT THE INVENTION

In order to make clearer the objectives, technical solutions and advantages of the present invention, the present invention will be further described in greater detail below in conjunction with specific embodiments and with reference to the accompanying drawings.

It should be noted that all the expressions "first" and "second" used in the embodiments of the present invention are for distinguishing two different entities or two different parameters in the same name, seen as such, "first" and "second" are merely used for convenience of expression, and should not be construed as limitation to the embodiments of the present invention, and this will not be described one by one in subsequent embodiments.

Embodiments of the present invention provide a robust and reliable edge storage method for the Internet of Things, and it also provide a robust and reliable edge storage system for the Internet of Things for completing the method.

Figure 1:
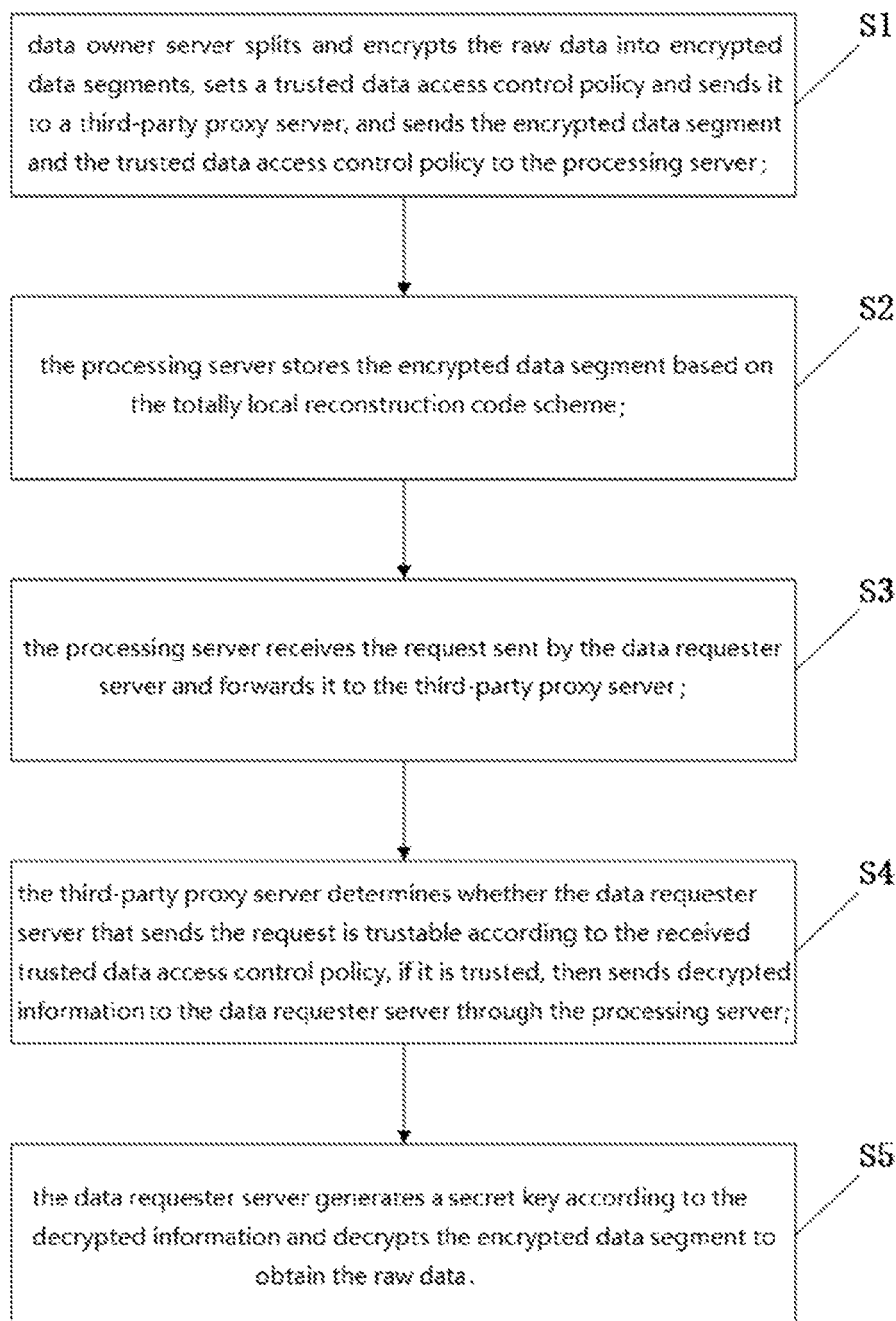
FIG. 1 is a specific step diagram of a robust and reliable edge storage method for an Internet of Things according to an embodiment of the present invention.

Referring to FIG. 1, the method according to the embodiment of the present invention includes the following steps:

S1: A data owner server splits and encrypts the raw data into encrypted data segments, sets a trusted data access control policy and sends it to a third-party proxy server, and sends the encrypted data segment and the trusted data access control policy to a processing server.

In this step, the data owner server is any edge device, and the edge device is any smart device that can generate Internet of Things data. After generating the raw data, the data owner server splits and encrypts the raw data into k encrypted data segments by the data splitting function in the data owner server based on a Totally Local Reconstruction Code scheme (also referred to as TLRC scheme), thus forming a rectangular coding structure TLRC (k, q, r) containing q rows and r columns, where k=q*r. The data owner server sets a trusted data access control policy, and the trusted data access control policy sets a predefined threshold of trust level. The data owner server sends the trusted data access control policy to the third-party proxy server and sends the encrypted data segment and the trusted data access control policy to the processing server.

S2: The processing server stores the encrypted data segment based on a totally local reconstruction code scheme.

In this step, the processing server receives the encrypted data segment and the trusted data access control policy sent by the data owner server, and forms a local parity check segment based on the totally local reconstruction code scheme according to all the encrypted data segments from each row or column. The local parity check segment includes: a horizontal local parity check segment and a vertical local parity check segment. The horizontal local parity check segment is generated by extracting r encrypted data segments in each row in step S1 and performing an exclusive OR (also referred to as XOR) operation on all r encrypted data segments. The vertical local parity check segment is generated by extracting q encrypted data segments in each column in step S1 and performing an exclusive OR operation on all q encrypted data segments. The processing server stores the encrypted data segment through the local parity check segment. Several edge servers are set in the processing server. In step S1, the k encrypted data segments are respectively received and stored by the k edge servers. Each time the local parity check segment is generated, it will be received and stored by a new edge server.

When the encrypted data segment fails, the processing server extracts all the encrypted data segments and the local parity check segment of the row or column where the failed encrypted data segment is located based on the totally local reconstruction code scheme to recover the failed encrypted data segment. During the recovery process, the processing server only accesses all the encrypted data segments and the local parity check segments in the row or column where the failed encrypted data segment is located, and does not access all the encrypted data segments, thereby reducing the probability of leakage of the encrypted data segment and the raw data.

S3: The processing server receives the request sent by the data requester server and forwards it to the third-party proxy server.

In this step, the data requester server sends a data access request, the processing server receives the request, and determines whether the data requester server is the data owner server according to the trusted data access control policy sent by the data owner server, if so, it sends all the encrypted data segments stored in the processing server to the data owner server; if not, it forwards the request to the third-party proxy server.

S4: The third-party proxy server determines whether the data requester server that sent the request is trustable according to the received trusted data access control policy, and, if it is trusted, sends the decrypted information to the data requester server through the processing server.

In this step, the third-party proxy server receives the trusted data access control policy sent by the data owner server and the request forwarded by the processing server. The third-party proxy server is provided with at least four reputation center servers, each of the reputation center servers manages the registration material and historical behavior of the data requester server, and evaluates the trust level of the data requester server based on the registration material and historical behavior. The at least four reputation center servers determine whether the trust level of the data requester server that sends the request is greater than the predefined threshold set by the trusted data access control policy received by the reputation center, if yes, the data requester server which sends the request is initially trustable, and the reputation center server sends a consent operation; if not, the data requester server that sends the request is initially not trustable, and the reputation center server sends a rejection operation. If the reputation center server cannot determine the trust level of the data requester server, a neutral operation is sent, which is regarded as the consent operation. The trusted data access control policy is configured to determine whether the data requester server is trustable, and this process specifically includes the following steps:

If at least one of the reputation center servers sends a rejection operation, the data requester server is not trusted, and the third-party proxy server does not send the decrypted information to the data requester server through the processing server;

If none of the reputation center servers sends a rejection operation, the data requester server is trustable, and the third-party proxy server sends the decrypted information to the data requester server through the processing server.

If the encrypted data segment contains personal privacy data, at least three of the reputation center servers all send consent operations, then the data requester server is trustable, and the third-party proxy server sends the decrypted information to the data requester server through the processing server.

The data requester server may be registered at any one of the reputation center servers, and the reputation center server obtains the registration material of the data requester server and accesses the historical behavior of the data requester server. The historical behavior can be the basis for determining whether the data requester server is trustable. If the data requester server is not registered at any of the reputation center servers, the reputation center server cannot make a determination and does not accept any of the data access requests of the data requester server.

If the reputation center server is bribed by a malicious data requester server, then for the data access request sent by the malicious data requester server, the bribed reputation center server will determine the malicious data requester server as credible, and send a consent operation, but as long as at least one of the reputation center servers has not been bribed, it will determine the malicious data requester server as not trustable, and send a denial operation to deny data access request from the malicious data requester server, so as to protect the information security of the encrypted data segment and the raw data.

S5: The data requester server generates a secret key according to the decrypted information and decrypts the encrypted data segment to obtain the raw data.

In this step, the data requester server receives the decrypted information sent by the third-party proxy server through the processing server, generates the secret key according to the decrypted information, and sends a request to the processing server through the secret key. The data requester server obtains the encrypted data segment from the processing server, and the data requester server decrypts and aggregates the encrypted data segment through the secret key to obtain the raw data.

As can be seen from the above, a robust and reliable edge storage method for the Internet of Things is provided by the present invention. The data owner server reduces the communication overhead and response delay by splitting the raw data based on the totally local reconstruction code scheme, the processing server in the present invention improves data robustness and security by storing the encrypted data segment based on the totally local reconstruction code scheme, and when the server fails or the encrypted data segment fails, the processing server performs data recovery based on the totally local reconstruction code scheme. The recovery process only recovers within the range of the one row or one column and does not access the complete raw data. It provides an efficient fault-tolerant technology to maintain the availability of data and reduces the chance of data leakage. The present invention ensures that the third-party proxy server protects the data by setting at least four reputation center servers, even if a reputation center server is bribed by a malicious data requester, as long as at least one of the reputation center servers has not been bribed, data security can be ensured through the trusted data access control policy.

Based on the same inventive concept, the embodiment of the present invention also provides a robust and reliable edge storage system for the Internet of Things for implementing the method.

Figure 2:
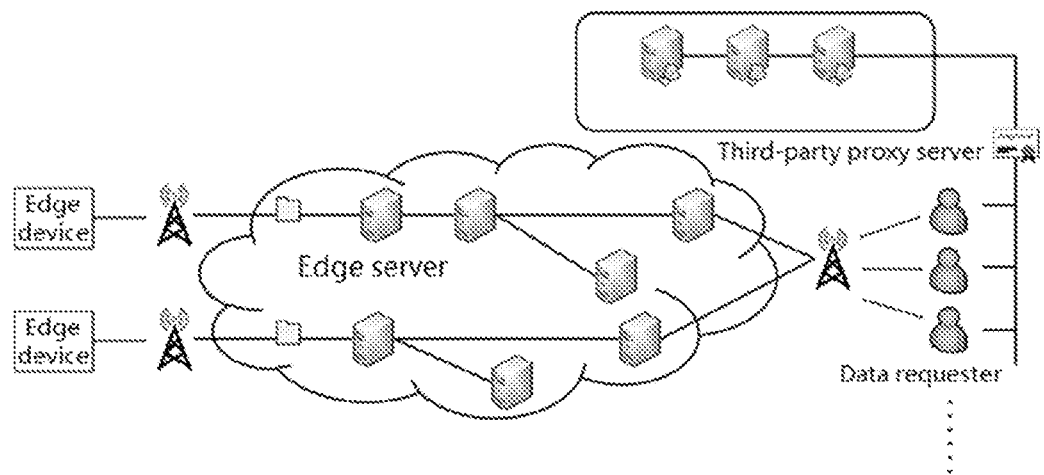
FIG. 2 is a diagram of a server setting of a robust and reliable edge storage system for the IOT according to an embodiment of the present invention.

Referring to FIG. 2, the system includes the following:

A data owner server, configured to split and encrypt the raw data into encrypted data segments, set a trusted data access control policy, send the encrypted data segments and the trusted data access control policy to the processing server, and send the trusted data access control policy to a third-party proxy server;

A processing server, configured to store the encrypted data segment based on a totally local reconstruction code scheme, receive the request sent by the data requester server and forward it to the third-party proxy server;

A third-party proxy server, configured to receive the trusted data access control policy to determine whether the data requester server that sent the request is trustable, and if it is trusted, send decrypted information to the data owner server through the processing server;

A data requester server configured to generate a secret key according to the decrypted information and decrypt the encrypted data segment to obtain the raw data.

The data owner server is provided with a number of edge servers, and the data owner server splits the raw data into i pieces of encrypted data segments, which are respectively stored in i edge servers, and the third-party proxy server is provided with i reputation center servers. One of the reputation center servers manages one of the edge servers independently. There is a private key in the reputation center server. The data owner server generates a secret key based on the raw data, the secret key is encrypted by the private key in the reputation center server, the number of the reputation center servers is i, the secret key is split into i-1 segments, an encryption key segment is generated to encode a redundant encryption key segment by the erasure code RS (i-1,1), the encryption key segment is stored in the edge server respectively where i-1 pieces of the encrypted data segments are stored, and the redundant encryption key segment is stored in the edge server of the i edge servers, which does not store the encryption key segment. The RS may also adopt other encoding methods. The third-party proxy server is provided with N reputation center servers. There is a private key in the reputation center server. The data owner server generates a secret key based on the raw data, the secret key is encrypted by the private key in the reputation center server, the secret key is split into K segments, and an encryption key segment is generated. M redundant encryption key segments are encoded by the erasure code RS (K, M), where the N=K+M, the encryption key segments are respectively stored in the edge server where the K encryption data segments are stored, and the M redundant encryption key segments are respectively stored in the edge server of the N edge servers, which does not store the encryption key segment. The encryption key segment and the redundant encryption key segment may be collectively referred to as an encoding encryption key segment, and any K number of the encoding encryption key segments can generate the secret key generated by the data owner server according to the raw data.

In this embodiment, the erasure code is encoded as RS (i-1, 1), p represents the probability that any of the reputation center servers sending consent operation after accepting a bribe, and γ represents the probability of the data requester registering in any of the reputation center servers, DL e (i) represents the leakage probability of the encrypted data segment when using i reputation center servers; the specific calculation is as follows:

In this embodiment, when the value of i is 4, the leakage probability DL e (i) of the encrypted data segment is specifically calculated as:

When the data is not encrypted, the leakage probability of the raw data is specifically calculated as:

By comparing the DLe (4) and the DL ne (4), it can be obtained that the leakage probability of the encrypted data segment after encryption is less than the leakage probability of the raw data not encrypted.

Figure 3:
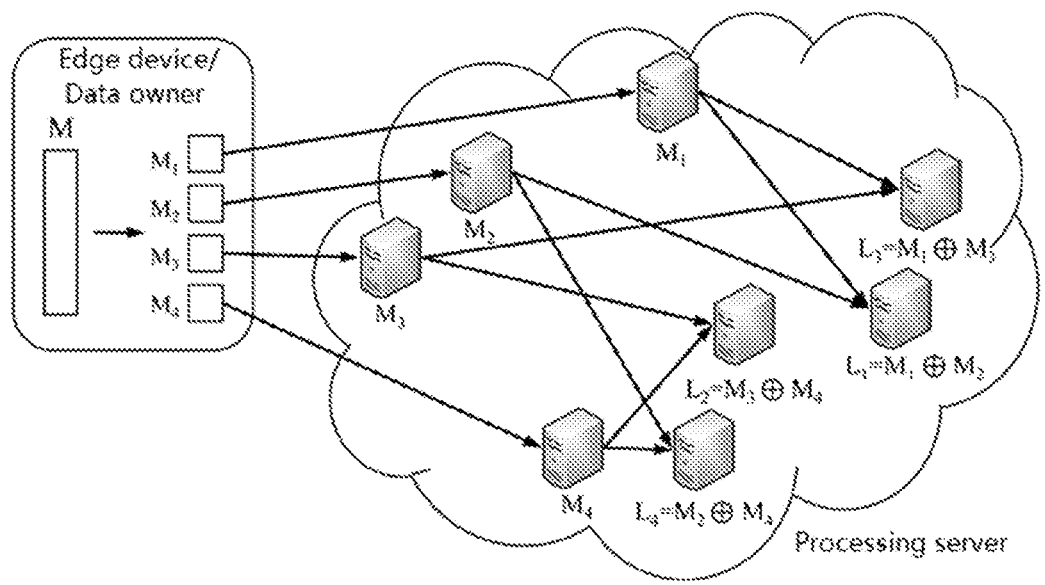
FIG. 3 is a diagram of the processing server storing the encrypted data segment according to an embodiment of the present invention.

Referring to FIG. 3, as an alternative embodiment, the data owner server splits and encrypts the raw data M into four encrypted data segments M 1, M 2, M 3 and M 4 to form a rectangular coding structure TLRC (4, 2, 2) including 2 rows and 2 columns, said four encrypted data segments are sent to four different edge servers provided in the processing server respectively by the data owner server. The processing server generates four local parity check segments L1, L2, L3 and L4 based on the totally local reconstruction code scheme and sends them to the different edge server different from the edge server which receives the encrypted data segment. All the encrypted data segments and the local parity check segments are stored in the processing server. All the local parity check segments are all calculated and generated at the processing server, and this meets the lightweight calculation requirements of the data owner or the edge device.

Figure 4:
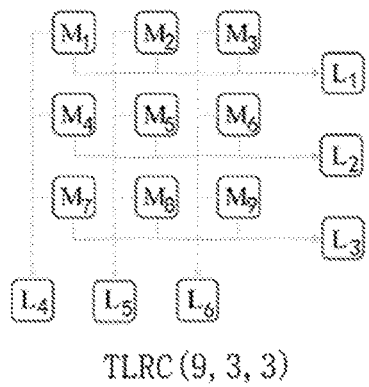
FIG. 4 is an explanatory view of TLRC in the embodiment of the present invention.

Referring to FIG. 4, TLRC is a Totally Local Reconstruction Code scheme, wherein the TLRC (9,3,3) the k=9, the r=3, the q=3, the k stands for the number of encrypted data segments into which the raw data is split and encrypted, the q is the number of rows, the r is the number of columns, the M 1, M 2, M 3, M 4, M 5, M 6, M 7, M 8 and M 9 are the nine encrypted data segments, the L1, L2 and L3 are horizontal local parity check segments, and the L4, L5 and L6 are vertical local parity check segments. In this embodiment, when the M 1 fails, the processing server sets up an edge server to call the M2, M3, and L3 to recover the failed M1. The TLRC can recover most up to 3 failed encrypted data segments and the local parity check segments, except that when one of the horizontal local parity check segments fails, one of the vertical local parity check segments fails, and when the encrypted data segment at the intersection of the failed horizontal local parity check segment and the failed vertical local parity check segment fails, the TLRC cannot recover the failed part. As described in this embodiment, the horizontal local parity check segment L3 cannot be recovered, when the vertical local parity check segment L6 and the encrypted data segment M 9 fail at the same time.

Figure 5:
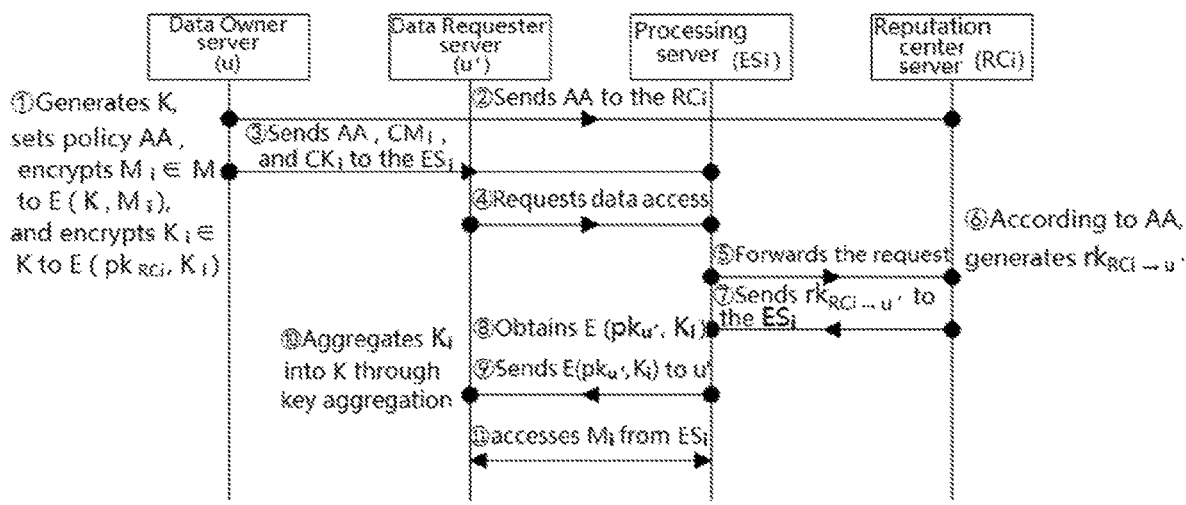
FIG. 5 is a data access process flow chart in the embodiment of the present invention.

Table 1 Summary of main concepts
Main concepts description
M Complete IoT data
M 1, M 2, . . . Split IoT data segments
CM i Encrypted IoT data segments
L Local parity check segment calculated based on a set of data segments
G Global parity check segment calculated based on all data segments
k the number of split data segments
m, q, r Number of calculated parity check segments of data
K Generated data encryption key
CK Encrypted data encryption key
K 1, K 2, . . . Split data encryption key
CK i Encrypted and split data encryption key
pk Public key
sk Private key
NoRC Number of reputation centers
AA Trusted data access control policy
rk RCi→u' Re-encrypted data encryption key Referring to FIG. 5 and Table 1, the process of data access performed by the data requester includes the following steps:

The data owner server generates K, sets policy AA, encrypts Mi∈M to E (K, M i), and encrypts Ki∈K to E (pk RCi, K i);

The data owner server sends AA to the reputation center server;

The data owner server sends AA, CM i, and CK i to the edge server;

The data requester server sends a data access request to the edge server;

The edge server receives the data access request, determines whether the data requester server is the data owner server, and if so, sends AA, CM i, and CK i to the data owner server, if not, then forwards the data access request to the reputation center server;

The reputation center server receives the data access request, determines whether the data requester server is trustable according to AA, if yes, generates rkRCi→u', if not, then rejects the data access request;

The reputation center server sends rkRCi→u' to the edge server;

The edge server generates E (pku', Ki) according to rk RCi→u' and sends it to the data requester server;

33The data requester server aggregates Ki into K through key aggregation according to E (pku', Ki);

The data requester server uses K to access the edge server to obtain Mi.

In order to straightforwardly demonstrate the performance advantages of the robust and reliable edge storage method and system for the Internet of Things, a comparative experiment was set up and performance simulation was performed. Specific experimental settings include the following:

Topology structure. In the experiment, a network topology with different numbers of nodes ranging from 40 to 220 was generated. In the topology structure, each of the nodes represents one edge server. Assuming that the link cost is proportional to the geographical distance, the bandwidth of each link in the generated topology is set as 1 Gbps, and the data volume of each message is set as 1 GB;

A comparison algorithm, compare the LRC with the TLRC, wherein the coding structure selected by the LRC is LRC (12, 6, 2), the coding structure selected by the TLRC is TLRC4, TLRC9 and TLRC16, and the TLRC4 is TLRC (4,2,2), the TLRC9 is TLRC (9,3,3), and said TLRC16 is TLRC (16,4,4);

Evaluation indicators, including cost and delay. The cost is based on a preset cost of each link in the generated topology, and the storage or degraded read cost refers to the total cost of the transmission link in the data storage or degraded read operation; The delay is the transmission time of all the relevant encrypted data segments and the local parity check segments in the read or store operation reaching the edge server through the link with the lowest cost, in the case of the preset link bandwidth and message volume. The delay of a link will increase as the number of the encrypted data segments and the local parity check segments transmitted simultaneously increases, and the maximum delay of all the links determines the overall delay. The degraded read operation is a data recovery operation. The cost specifically includes storage cost and recovery cost in the embodiment of the present invention; the delay specifically includes storage delay and recovery delay in the embodiment of the present invention.

All experimental results are the average of 100 repeated experiments with different decentralized topologies.

Figure 6:
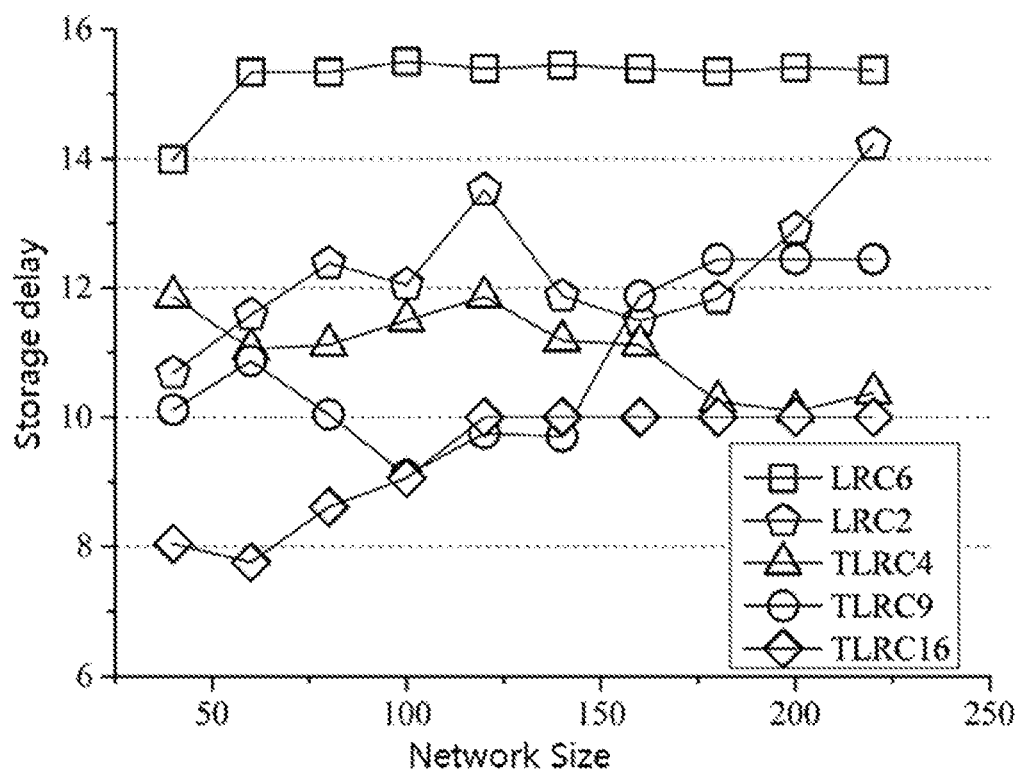
FIG. 6 is a comparison graph of average storage latency of LRC and TLRC in the embodiment of the present invention.

Referring to FIG. 6, the experiment generates a decentralized topology network structure and determines a data message of the IoT. One node in the generated topology is randomly selected as the edge device, and the node closest to the edge device is selected as the edge server that stores the IoT data message. In the message storage operation, compare the storage delays of LRC2, LRC6, TLRC4, TLRC9 and TLRC16. It can be obtained through experiments that the storage delay of the TLRC 16 is the lowest, and the storage delays of the overall three groups of test subjects of TLRC are lower than those of the overall two groups of test subjects of LRC.

Figure 7:
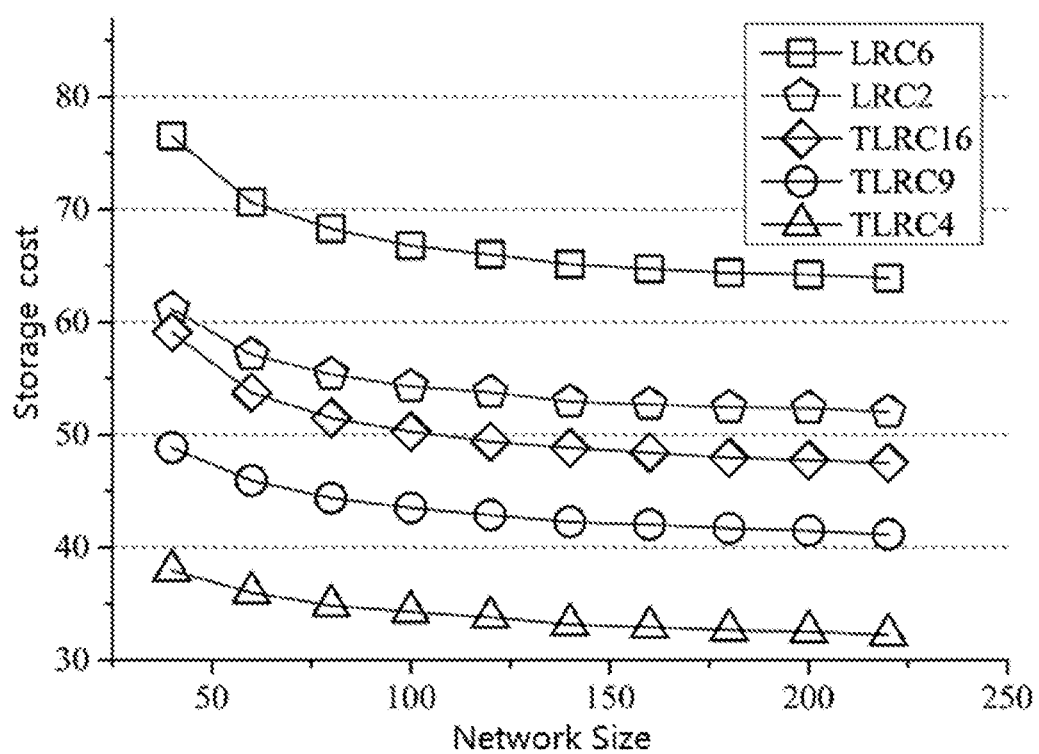
FIG. 7 is a comparison graph of the average storage cost of the LRC and TLRC in the embodiment of the present invention.

Referring to FIG. 7, the experiment generates a decentralized network topology, determines an IoT data message, randomly selects a node in the generated topology as an edge device, and selects the node closest to the edge device as the edge server storing IoT data message. In the message storage operation, compare the storage costs of LRC2, LRC6, TLRC4, TLRC9 and TLRC16. It can be obtained through experiments that the storage cost of the TLRC4 is the lowest, and the storage costs of the overall three groups of test subjects of the TLRC are lower than those of the overall two groups of test subjects of the LRC.

Figure 8:
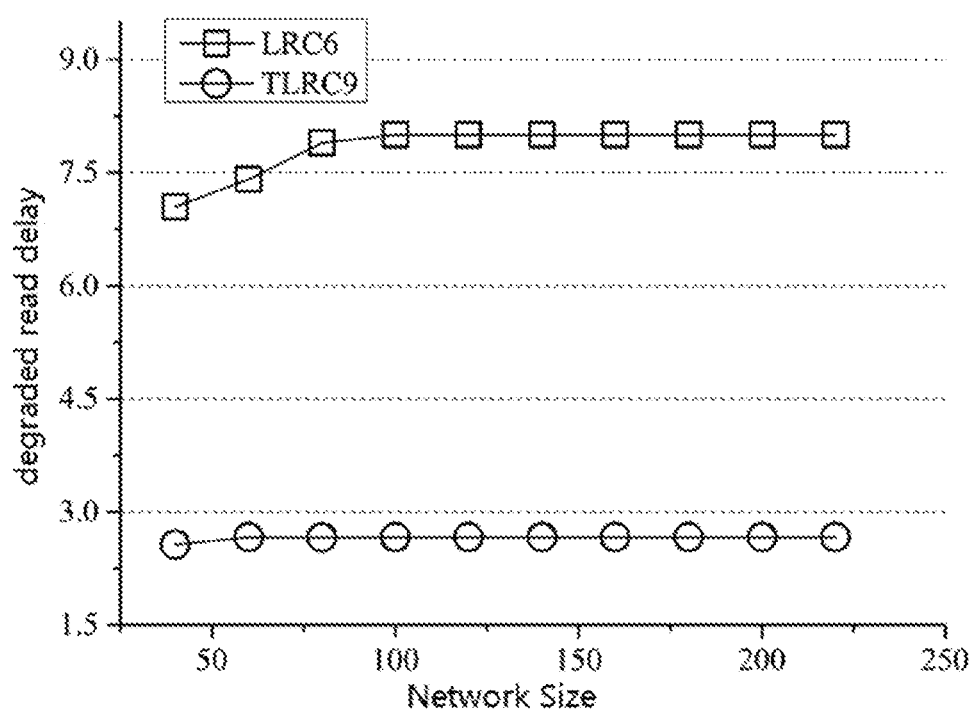
FIG. 8 is a comparison graph of the average degraded read latency of LRC and TLRC recovering a failed server in the embodiment of the present invention.

Referring to FIG. 8, the experiment generates a decentralized network topology, determines an IoT data message, randomly selects a node in the generated topology as an edge device, and selects the node closest to the edge device as the edge server storing IoT data message; during a message recovery operation, when a failure occurs in one of the encrypted data segment and the local parity check segment, the recovery delays of LRC6 and TLRC9 are compared. It can be obtained by experiment that the recovery delay of the TLRC9 is significantly lower than the recovery delay of the LRC6.

Figure 9:
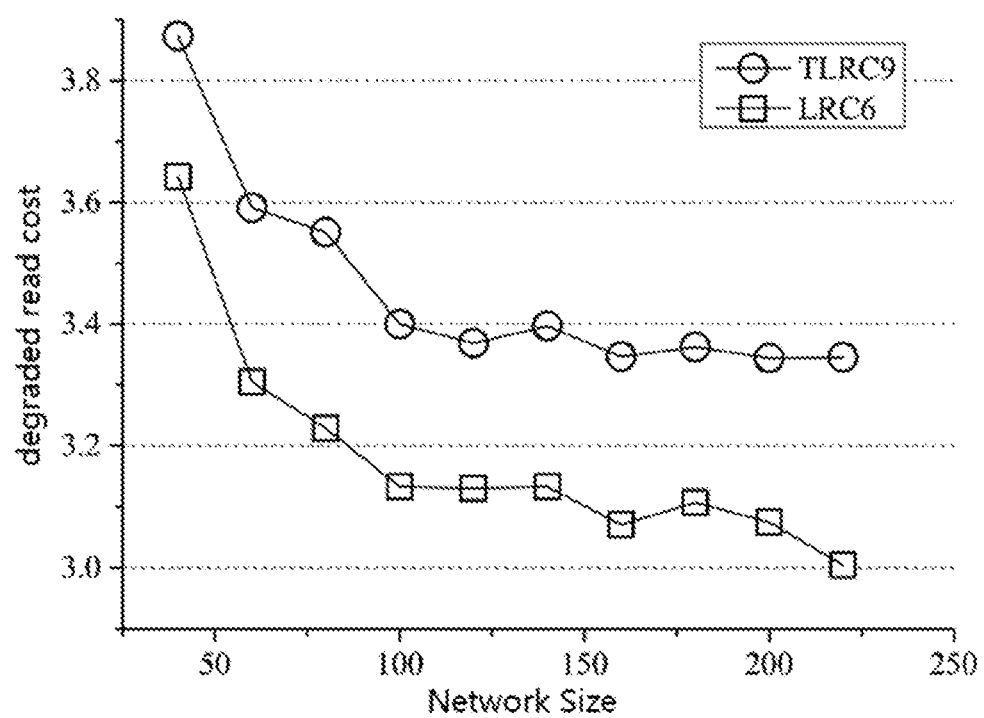
FIG. 9 is a comparison graph of average cost of degraded read for LRC and TLRC recovering a failed server in the embodiment of the present invention.

Referring to FIG. 9, the experiment generates a decentralized network topology, determines an IoT data message, randomly selects a node in the generated topology as an edge device, and selects the node closest to the edge device as the edge server storing IoT data message; during a message recovery operation, when a failure occurs in one of the encrypted data segment and the local parity check segment, the recovery costs of LRC6 and TLRC9 are compared. It can be obtained by experiment that the recovery cost of the TLRC9 is significantly higher than the recovery cost of the LRC6.

Figure 10:
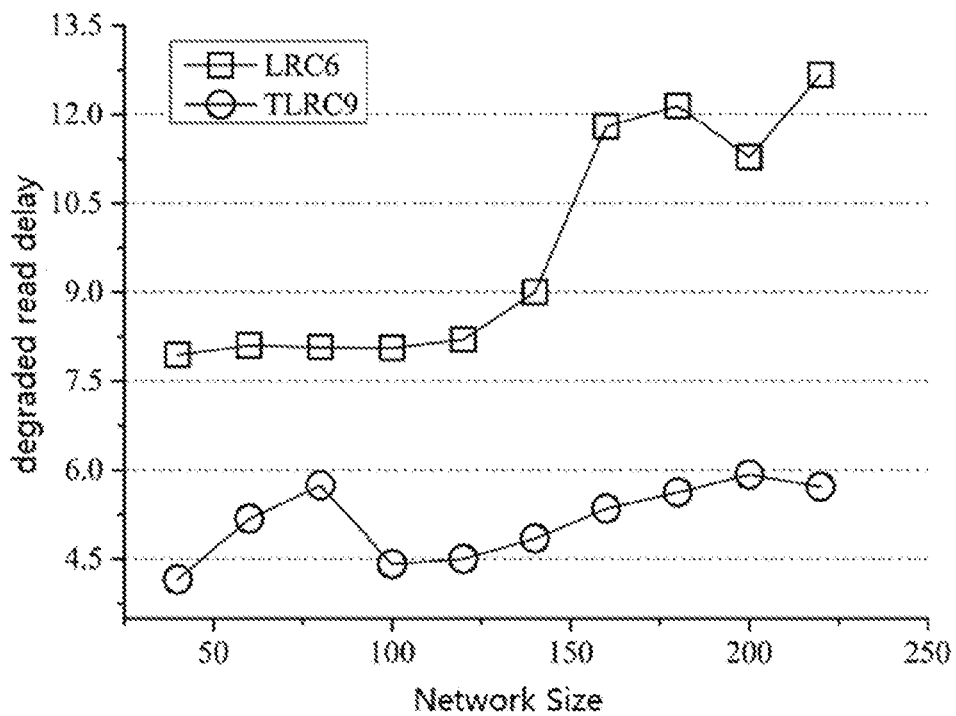
FIG. 10 is a comparison graph of average degraded read latency for LRC and TLRC recovering two failed servers in the embodiment of the present invention.

Referring to FIG. 10, the experiment generates a decentralized network topology, determines an IoT data message, randomly selects a node in the generated topology as an edge device, and selects the node closest to the edge device as the edge server storing IoT data message; during a message recovery operation, when two failures occur in the encrypted data segment and the local parity check segment, the recovery delays of LRC6 and TLRC9 are compared. It can be obtained by experiment that the recovery delay of the TLRC9 is significantly lower than the recovery delay of the LRC6.

Figure 11:
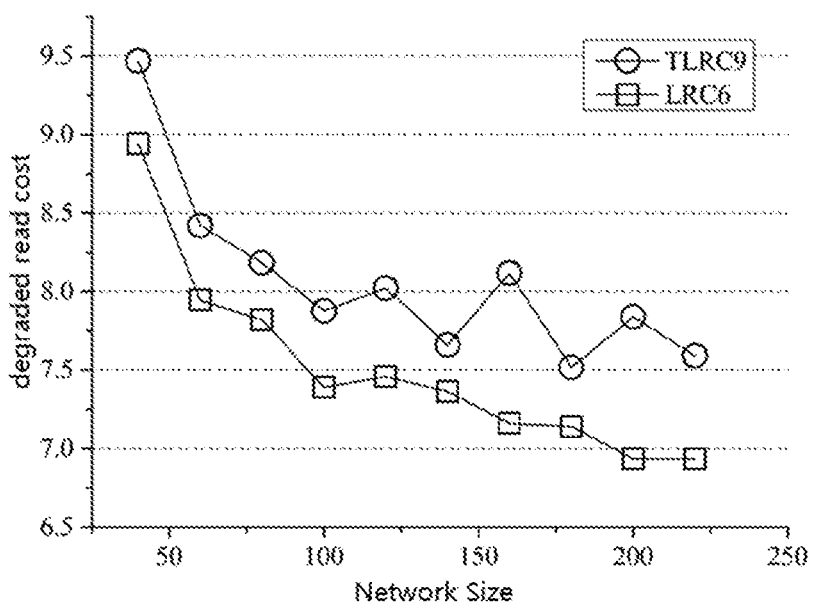
FIG. 11 is a comparison graph of the average degraded read cost for LRC and TLRC recovering two failed servers in the embodiment of the present invention.

Referring to FIG. 11, the experiment generates a decentralized network topology, determines an IoT data message, randomly selects a node in the generated topology as an edge device, and selects the node closest to the edge device as the edge server storing IoT data message; during a message recovery operation, when two failures occur in the encrypted data segment and the local parity check segment, the recovery costs of LRC6 and TLRC9 are compared. It can be obtained by experiment that the recovery cost of the TLRC9 is higher than the recovery cost of the LRC6.

Through the calculations of all experimental results, it can be concluded that TLRC encoding technology saves 35.40% of storage cost and 30.80% of storage delay compared to LRC encoding technology in data storage operation; in the data recovery operation, TLRC encoding technology saves 76.60% recovery delay, but increases the recovery cost by 8.70% compared to LRC encoding technology. The TLRC encoding technology reduces the storage cost and storage delay in the data storage operation, and in the data recovery operation, the recovery cost is only slightly increased, but the recovery delay is greatly reduced.

Those of ordinary skill in the art should understand that the discussion of any of the above embodiments is merely exemplary, and is not intended to imply that the scope of the present disclosure (including claims) is limited to these examples; under the spirit of the present invention, the above embodiments or the technical features in different embodiments can also be combined, and there are many other variations of the different aspects of the invention as described above, which are not provided in the details for simplicity. Thus, any omissions, modifications, alternatives, improvements, etc., within the spirit and principle of the present invention should be included in the protection scope of the present invention.

What is claimed is:

1. A robust and reliable edge storage method for the Internet of Things, comprising:
a data owner server splitting and encrypting raw data into an encrypted data segment based on a totally local reconstruction code scheme, said totally local reconstruction code scheme comprising: splitting and encrypting the raw data into k encrypted data segments, forming a rectangular coding structure including q rows and r columns, where k=q*r; setting a trusted data access control policy and sending it to a third-party proxy server, and sending the encrypted data segment and the trusted data access control policy to a processing server;

the processing server storing the encrypted data segment based on the totally local reconstruction code scheme, including: forming a local parity check segment according to all the encrypted data segment in a row or a column of each rectangular coding structure for storing the encrypted data segment; the processing server extracting all the encrypted data segment that fails, and extracting the local parity check segment from the row or the column where the failed encrypted data segment is located based on the totally local reconstruction code scheme to recover the failed encrypted data segment;

the processing server receiving a request sent by a data requester server and forwarding it to the third-party proxy server;

the third-party proxy server determining whether the data requester server that sends the request is trustable according to the received trusted data access control policy; sending decrypted information to the data requester server that is trusted through the processing server; and the data requester server generating a secret key according to the decrypted information and decrypting the encrypted data segment to obtain the raw data.

2. The method according to claim 1, wherein the processing server receiving the request sent by the data requester server and forwarding it to the third-party proxy server specifically comprises: the processing server receiving the request sent by the data requester server, and determining whether the data requester is the data owner server according to the trusted data access control policy, then sending the decrypted information to the data requester that is the data owner server; and then otherwise forwarding the request to the third-party proxy server.

3. The method according to claim 1, wherein the third-party proxy server determining whether the data requester server that sends the request is trustable according to the received trusted data access control policy specifically includes: the third-party proxy server being provided with at least four reputation center servers, the at least four reputation center servers respectively determining whether the data requester server is initially trustable,
with all the at least four reputation center servers sending consent operations, the consent operation indicating that the reputation center server determines that the data requester server is initially trustable, then the data requester server is trusted; and
with at least one of the reputation center servers a rejection operation, the rejection operation indicating that the reputation center server determines that the data requester server is not initially trustable, then the data requester server is not trusted.

4. The method according to claim 3, wherein trust value of the data requester server that is initially trustable is greater than a predefined threshold of the reputation center server; and the trust value of the data requester server that is not trusted is less than or equal to the predefined threshold of the reputation center server.

5. The method according to claim 1, wherein the third-party proxy server determining whether the data requester server that sends the request is trustable according to the received trusted data access control policy specifically includes: the third-party proxy server being provided with at least four reputation center servers, the at least four reputation center servers respectively determining whether the data requester server is initially trustable, and for the data requester server that is initially trustable, then a consent operation being sent, for the data requester server that is not initially trustable, a rejection operation being sent, for the data requester server that is not determined whether the data requester server is initially trustable, a neutral operation being sent;

with at least one of the reputation center servers sending the rejection operation, then the data requester server is not trusted, and the third-party proxy server does not send the decrypted information to the data requester server through the processing server; and with none of the reputation center servers sending the rejection operation, then the data requester server is trusted, and the third-party proxy server sends the decrypted information to the data requester server through the processing server.

6. The method according to claim 5, wherein with the encrypted data segment personal privacy data, and at least three of the reputation center servers all send consent operations, then the data requester server is trusted, and the third-party proxy server sends the decrypted information to the data requester server through the processing server.

* * * * *